(12) United States Patent  (10) Patent No.: US 7,681,846 B1
Mijailovic  (45) Date of Patent: Mar. 23, 2010

(54) STEADYING CAMERA SUPPORT PLATFORM

(76) Inventor: Vladan Mijailovic, 24034 Hillhurst Dr., West Hills, CA (US) 91307

( * ) Notice: Subject to any disclaimer, the term of this patent is extended or adjusted under 35 U.S.C. 154(b) by 1262 days.

(21) Appl. No.: 10/626,110

(22) Filed: Jul. 23, 2003

(51) Int. Cl.
*F16M 11/14* (2006.01)

(52) U.S. Cl. ............. 248/181.1; 248/122.1; 248/177.1; 248/178.1; 248/288.31

(58) Field of Classification Search .............. 248/176.1, 248/177.1, 178.1, 179.1, 181.1, 181.2, 183.1, 248/184.1, 183.2, 185.1, 276.1, 288.31
See application file for complete search history.

(56) References Cited

U.S. PATENT DOCUMENTS

| | | | | |
|---|---|---|---|---|
| 875,034 A * | 12/1907 | Wright | ..................... | 248/181.1 |
| 1,166,018 A * | 12/1915 | Soresi | ............................. | 5/608 |
| 1,272,574 A * | 7/1918 | Thomas | ..................... | 248/181.1 |
| 1,764,721 A * | 6/1930 | Hayden | ..................... | 248/186.2 |
| 1,797,893 A * | 3/1931 | Zerk | ......................... | 248/181.1 |
| 2,136,035 A * | 11/1938 | Altemus et al. | ........... | 248/181.1 |
| 2,560,884 A * | 7/1951 | Nagourney | .............. | 248/124.1 |
| 2,752,116 A * | 6/1956 | Minnis | ..................... | 248/181.1 |
| 3,211,405 A * | 10/1965 | Fey et al. | .................. | 248/183.2 |
| 4,158,489 A * | 6/1979 | Gottschalk et al. | ........... | 352/243 |
| 4,491,435 A * | 1/1985 | Meier | ............................ | 403/55 |
| 4,953,852 A * | 9/1990 | Donohue | ...................... | 482/87 |
| RE34,120 E * | 11/1992 | Plahn | ....................... | 248/206.3 |
| 5,544,968 A * | 8/1996 | Goellner | ....................... | 403/31 |
| 5,806,821 A * | 9/1998 | Phillips et al. | .......... | 248/288.51 |
| 6,119,995 A * | 9/2000 | Reese et al. | ............ | 248/288.51 |
| 6,220,556 B1 * | 4/2001 | Sohrt et al. | .............. | 248/279.1 |
| 6,254,044 B1 * | 7/2001 | Lee | ........................... | 248/177.1 |
| 6,439,518 B2 * | 8/2002 | Brotz et al. | .............. | 248/187.1 |
| 6,499,706 B1 * | 12/2002 | Sherlock et al. | ........... | 248/177.1 |
| 6,513,774 B2 * | 2/2003 | Hailson | .................. | 248/288.51 |
| 6,575,653 B1 * | 6/2003 | Krauter | ........................ | 403/55 |
| 6,729,778 B1 * | 5/2004 | Wu et al. | ..................... | 396/428 |

* cited by examiner

*Primary Examiner*—Amy J. Sterling
(74) *Attorney, Agent, or Firm*—Richard K Thomson (57) ABSTRACT

A support platform for a video camera allows cushioning of jostling attendant to walking motion so that the video quality is unaffected by the photographer's movements. A sphere of TEFLON polymer floats in a socket plate permitting hand movements about the roll and pitch axes of ±60° and ±360° about the yaw axis without jarring the camera. A second embodiment affords the ability to mount an additional camera to provide shots in a plurality of directions on a single take. Yet another feature of the invention is a hands-free support arm usable with the support platform.

8 Claims, 8 Drawing Sheets

STEADYING CAMERA SUPPORT PLATFORM

BACKGROUND AND SUMMARY OF THE INVENTION

The present invention is directed to the field of camera mounts. More particularly, the present invention comprises a camera mount for hand-held video recorders which can hold a camera steady if the support platform is maintained within ±60° about the x-axis and the z-axis while permitting complete unimpeded rotation about the y-axis.

A number of devices, such as Steadicam® stabilizing device, have been developed for use by professional cameramen. These devices are, typically, large, bulky and too expensive for use by the average video buff and, many of these devices are unsuitable for use by the smaller, light-weight video cams available today.

The steadying camera support platform of the present invention provides a much simpler, effective device for use with the camcorders currently being used while providing a great deal of flexibility for both mounting the camera and obtaining a variety of shots for the user. In addition, the support platform of the present invention maintains the video camera level, front-to-back and side-to-side, if the platform is maintained within ±60° from horizontal. The present invention comprises a platform to which the camera is secured; a support shaft attached to a bottom surface of the platform; a sphere affixed to an upper portion of the support shaft; a socket plate member which pivotally captures the sphere in a socket formed therein; a balance plate mounted on a bottom portion of the support shaft to help counterbalance the weight of the camera; means attachable to the socket plate member by which the platform support and its cargo is suspended; whereby when the platform support with its cargo is transported during video taping using the means attachable to the socket plate member, the camera is maintained in a steady position.

The socket plate member permits the sphere to pivot ±60° about the 'x' (or roll) axis, +60° about the 'y' (or pitch) axis, and ±360° about the 'z' (or yaw) axis. The support shaft is preferably formed in a first upper portion and a second lower portion with the first upper piece capable of being locked in any desired, position within an angle of ±60° relative to the second lower piece. This will enable the user to obtain an upwardly or downwardly peering viewpoint for her/his shot.

The socket plate member is preferably formed as a first upper plate with a first downwardly directed truncated spherical recess and a second lower plate with a second upwardly directed truncated spherical recess, the first and second truncated spherical recesses capturing the spherical ball and serving as the spherical ball's bearing surface. The spherical ball is preferably made of a self-lubricating material such as TEFLON polymer.

The means attachable to said socket plate in one embodiment comprises a handle. The handle preferably has a first straight portion and a second angled portion, the second portion being angled downwardly 15° with respect to first straight portion. The means attachable to said socket plate in a second embodiment comprises a hands-free support arm. The hands-free support arm comprises a first top bar pivotally connected to a first vertically extending member at its first end and to a second vertically extending member at its second end; a second bottom bar pivotally connected to the first vertically extending member at its first end and to the second vertically extending member at its second end, the first top bar, the second bottom bar, and the first and second vertically extending members forming a parallelogram linkage; means to attach the first vertically extending member to the camera platform support; adjustable leveling means associated with the second vertically extending member to position the camera platform support at a desired height; attachment means to secure the hands-free support arm to a user's body; whereby a full weight of said camera support platform and the camera mounted thereon is carried by the user's body leaving her/his hands free.

The adjustable leveling means can take the form of an air cylinder connected between said parallelogram linkage and said second vertical member and a secondary reservoir to provide cushioning against jerking movement. Alternatively, the parallelogram linkage can be mounted on a support block with the second lower bar being extended such that an adjustable spring can engage the portion which extends beyond its pivot point to cantilever the hands-free unit and its cargo.

Another aspect of the present invention is a dual platform mounting system for supporting multiple cameras to enable a photographer to simultaneously obtain multiple shots in different directions. When editing the film, the two views can be joined together in the same frame or spliced seriatim to show the different views, for example, in opposite directions. This configuration includes a first platform to which a first camera is secured; a support shaft attached to a bottom surface of said platform; a balance plate mounted on a bottom portion of said support shaft to help counterbalance a weight of the first camera, said balance plate mounting a second camera; means attachable to said support shaft by which said platform support and its cargo is suspended; whereby two cameras may simultaneously video tape in different directions to provide a film editor with differently directed shots taken during a single take.

While the simplicity and, hence, the lower expense associated with the current platform support will make the device of the present invention attractive to the amateur photographer, the versatility and practical features of this device will make it a favorite with the professional, as well.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
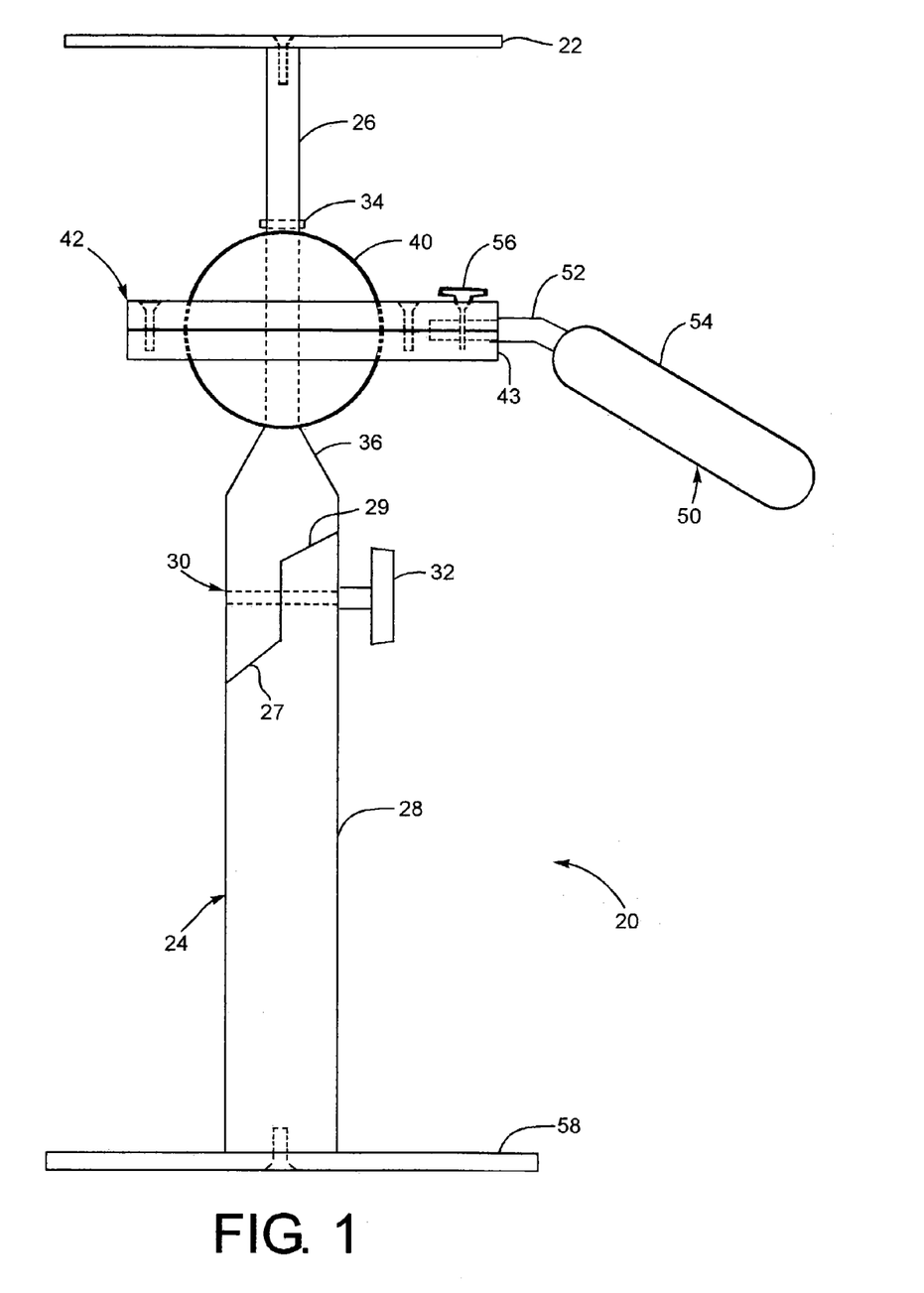
FIG. 1 is a side view of a first embodiment of the platform support of the present invention.
Figure 2:
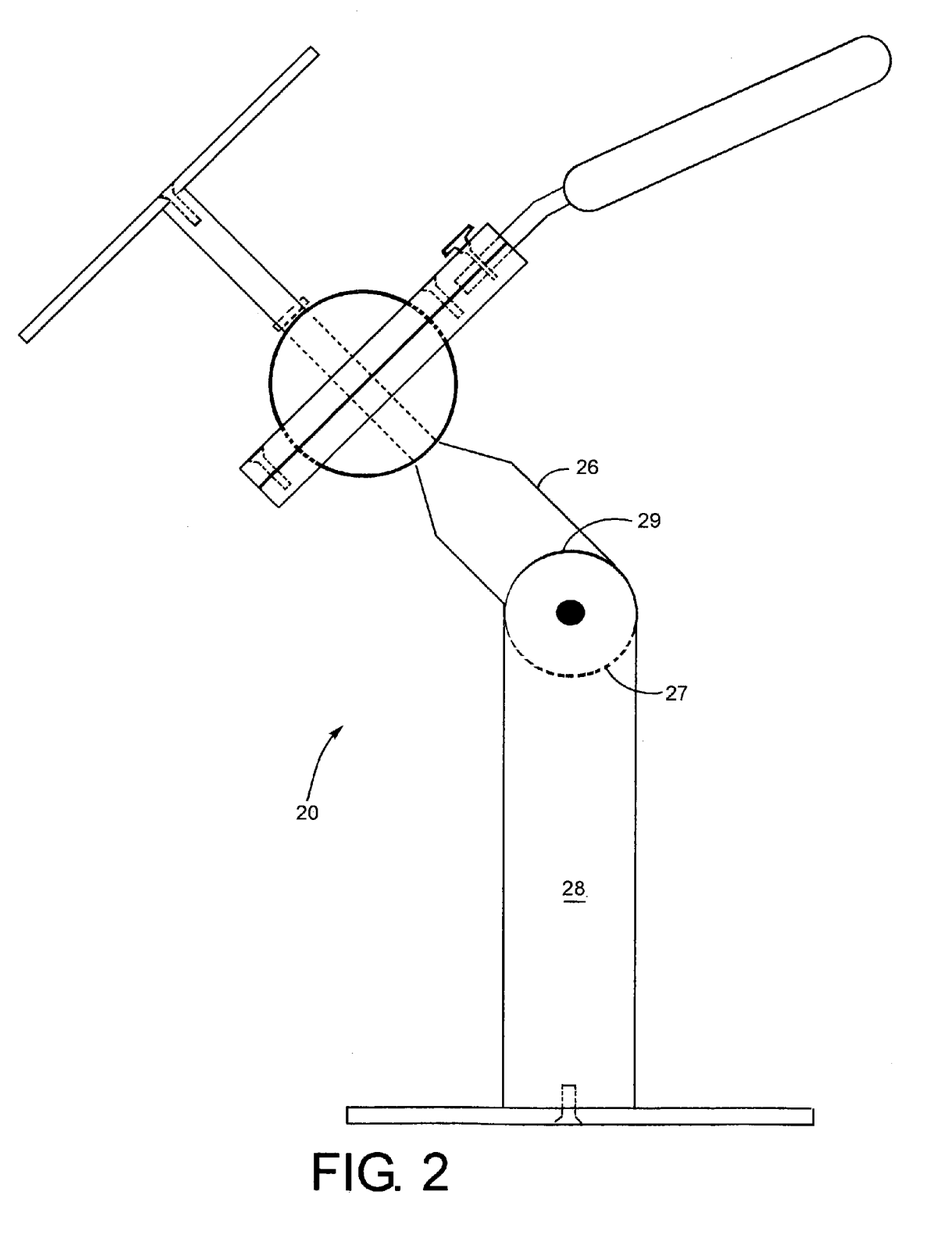
FIG. 2 is a side view of the first embodiment with the handle rotated 90° and with the upper piece of the support shaft tilted forward.
Figure 3:
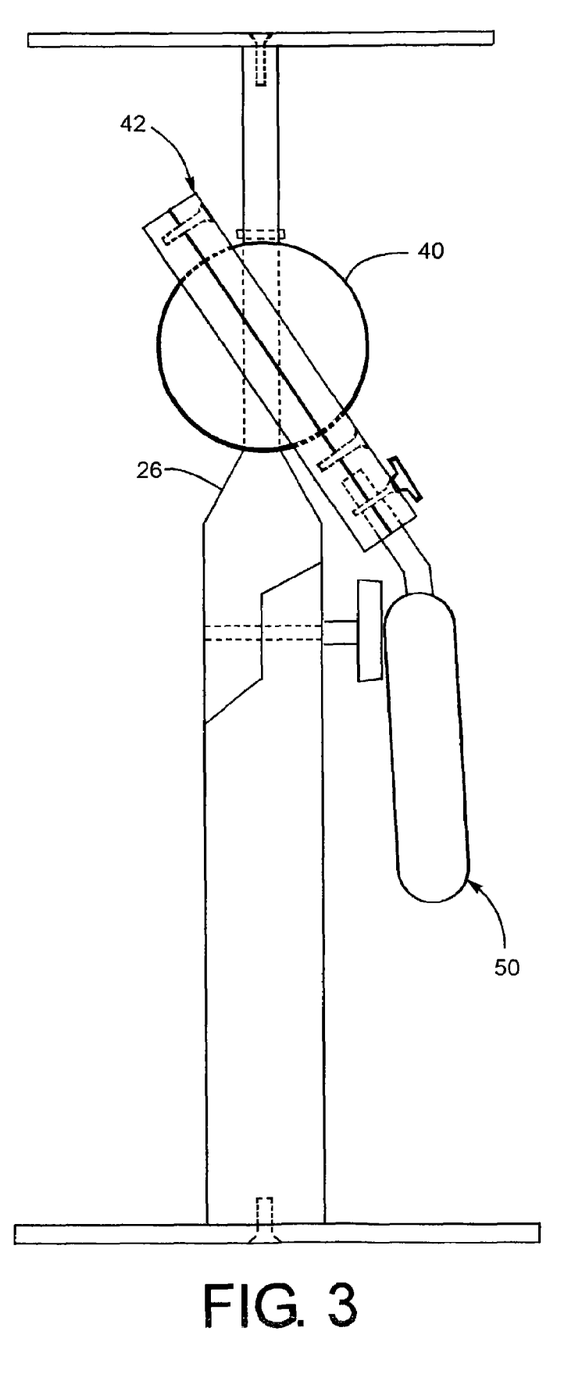
FIG. 3 is a side view of the first embodiment with the handle canted rearwardly a maximum amount (at least 60°)

A first embodiment of the platform support of the present invention is depicted in FIGS. 1-3 generally at 20. The platform support 20 includes support plate 22 with support shaft 24 attached to the bottom of support plate 22. Support shaft 24 preferably has a first upper piece 26 and a second lower piece 28 joined by pivot joint 30. Lower end 27 of upper piece and upper end 29 of lower piece 28 are radiused to permit pivoting of at least ±60° from vertical (see FIG. 2). Loosening and re-tightening adjustment screw 32 will permit the user to obtain either an upwardly or downwardly peering camera angle of between 0 and 60°.

Figure 5A:
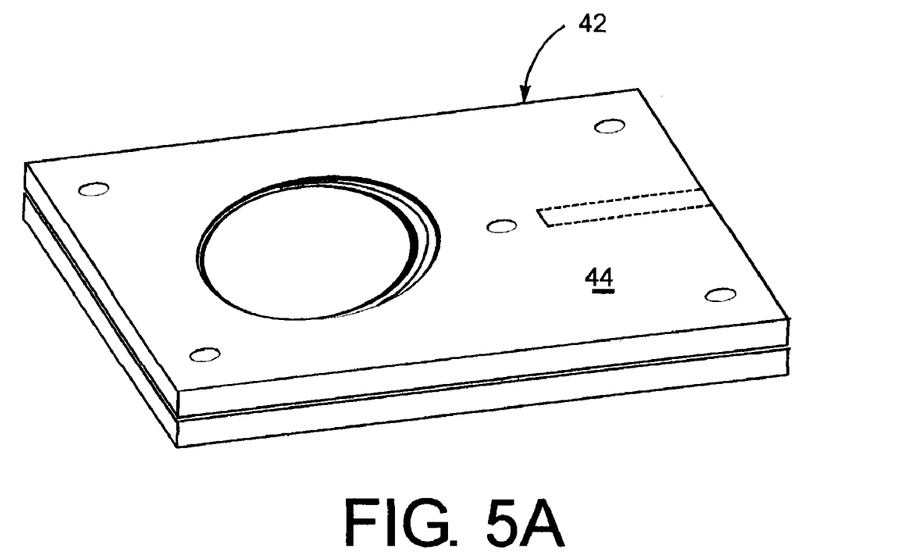
FIG. 5A is a perspective view of the socket plate of the first embodiment.
Figure 5B:
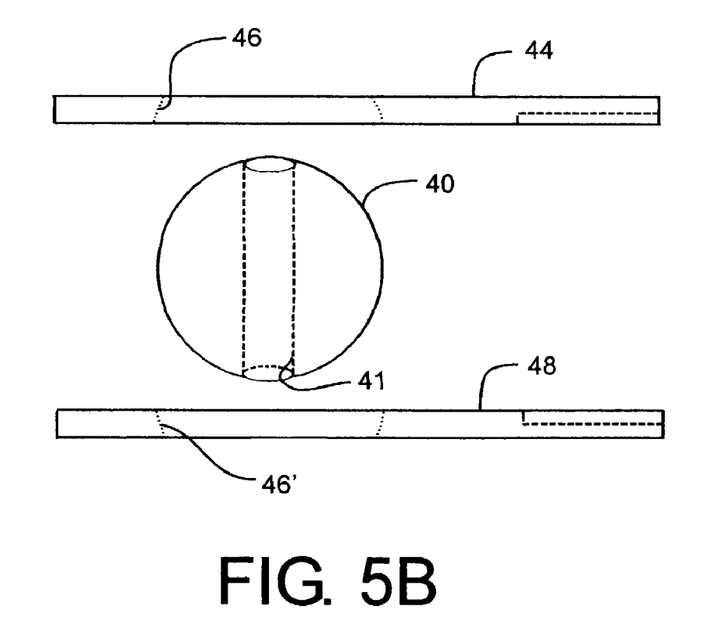
FIG. 5B is an exploded view of the socket plate.

Mounted on the upper portion 26 of support shaft 24 is a spherical ball 40 which has an axial hole 41 there through of a diameter sufficient to accommodate the upper portion 26. A cotter pin 34, or the like, holds the ball 40 against upward vertical movement while the shoulder 36 formed atop lower piece 28 of the support shaft 24 restricts its downward motion. Spherical ball 40 is preferably made of a self-lubricating material, such as TEFLON polymer, while the balance of the platform support 20 is preferably made of aluminum, or a similar light weight material. A socket plate 42 is formed of a first upper plate 44 with a downwardly directed truncated spherical recess 46 and second lower plate 48 with a upwardly directed truncated spherical recess 46' (FIGS. 5A and 5I3). These two recesses 46 and 46' capture spherical ball 40 and serve as its bearing surface, permitting at least ±60° rotation about the 'x' (or roll) axis and the 'y' (or pitch) axis, as limited only by the engagement of the socket plate 42 with shoulder (36 FIG. 3). Spherical ball 40 call freely rotate in socket plate 42 about the 'z' (or yaw) axis freely turning about the z-axis through 360°.

Handle 50 has a first straight portion 52 which is retained in an aperture in an edge portion 43 of socket plate 42 by thumb screw 56. A second straight portion 54 of handle 50 is angled downwardly 15° from the first straight portion 52 to provide a more natural gripping angle for a user's hand and providing better balance. A balance plate 58 is attached to the bottom of the support shaft 24 and provides a surface upon which the device 20 can stand, with or without the camera attached to support plate 22.

Figure 4A:
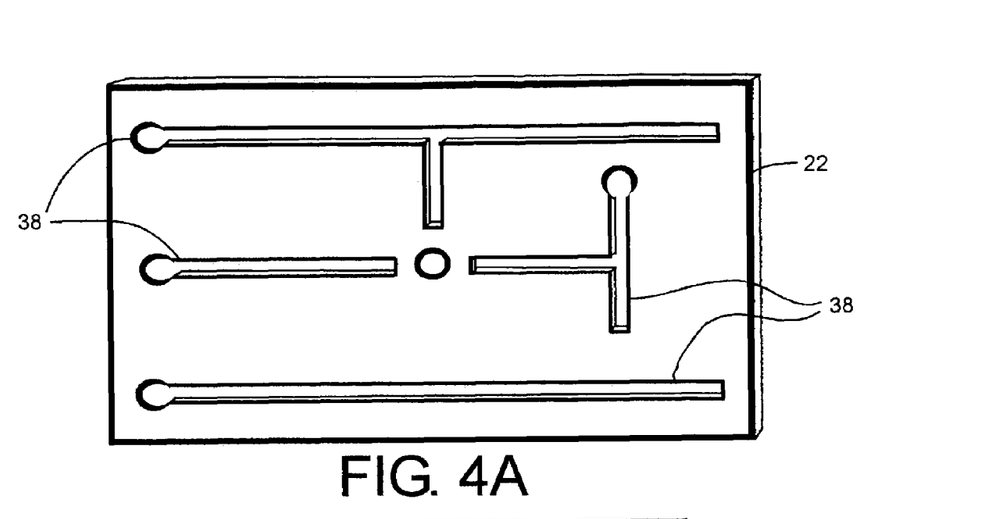
FIG. 4A is a top view of the top platform plate of the first embodiment.

As seen in FIG. 4A, support plate 22 has a plurality of mounting slots 38 to permit a camera to be mounted in a variety of positions covering virtually any direction. With the camera thus mounted, the platform support 20 can be carried using handle 50. While walking, the socket plate 42 cushions the bouncing, or jerking, motion associated with walking so that the camera moves smoothly during video recording while maintaining the camera vertically plumb recording a horizontal frame so that the video quality is not disturbed. By grasping the balance plate 58 or the support shaft 24 with the other hand, the platform plate 22 with the camera thereon can be rotated 360° about the yaw axis to provide a complete panoramic view. In addition, the camera platform can be tilted about the pitch axis to look vertically, up and down a building, for example, as much as ±60°, while jostling around the roll axis of handle 50 will not be imparted to the camera, as long as the movement does not exceed ±60°.

Figure 4B:
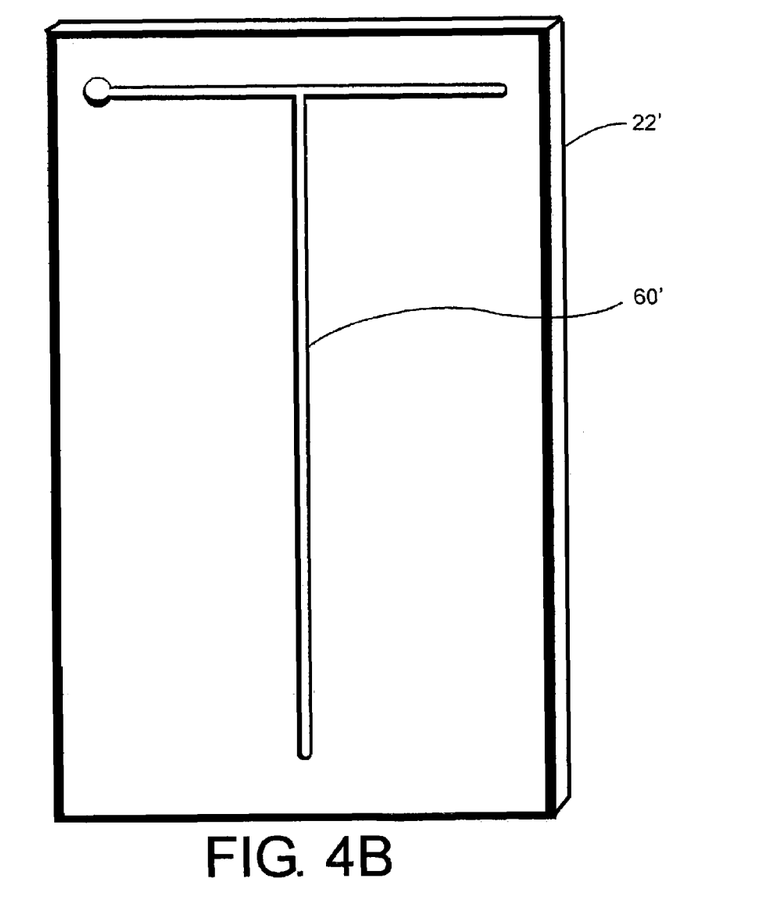
FIG. 4B is a top view of the bottom platform plate of the first embodiment.
Figures 6, 7A, 7B:
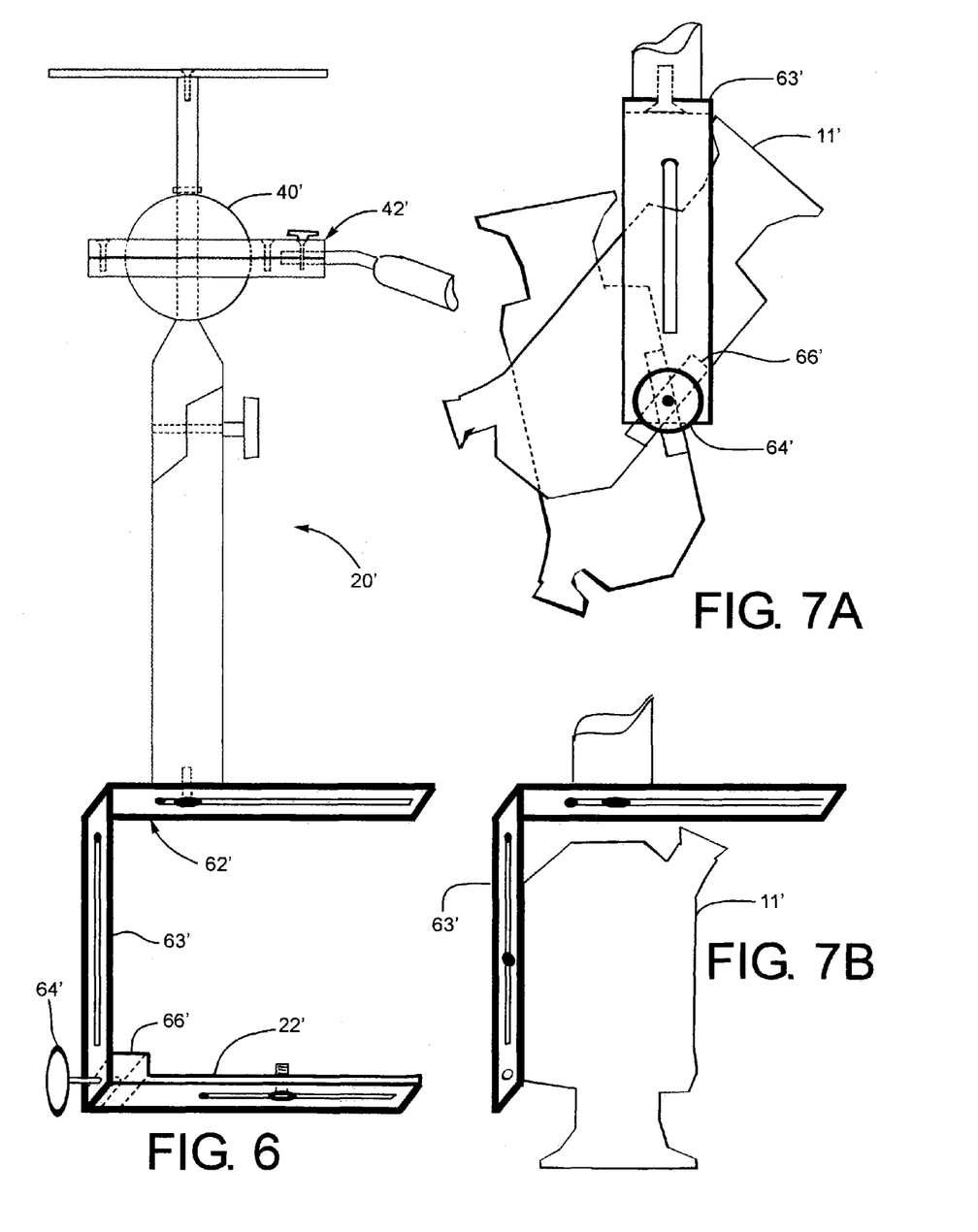
FIG. 6 is a side view of a second embodiment of the invention.
FIG. 7A is a front view of the lower mount depicting its mounting range.
FIG. 7B is a side view of the lower mount showing a camera mounted to tape straight down.

A second embodiment of the platform support of the present invention is depicted in FIG. 6 generally at 20'. In this embodiment the balancing plate mounted on the bottom of support shaft 24' is replaced by a second support plate 22'. FIG. 4B depicts the pattern of slots 60' formed in second lateral support plate 22'. Second lateral support plate 22' is mounted to vertical arm 63' of L-shaped support plate 62' by thumb screw 64' threadingly engaging in block 66'. As seen in FIG. 7A, second lateral support plate 62' can be pivoted to any desired angle throughout 360° (with the exception of the 20° occupied by the horizontal arm 61' of L-shaped support plate 62'). By mounting the camera 11' on the vertical arm 63', the camera can be pointed directly downward as seen in FIG. 7B or, if mounted on the outer face of vertical arm 63', directly upward. The benefit provided by this second embodiment 20' is that the film maker can simultaneously obtain views in a plurality of directions in a single shoot. The lower camera 11' further provides a counter weight for the upper camera, balancing the platform support 20' about the pivot of spherical ball 40' in socket plate 42'.

Figure 8:
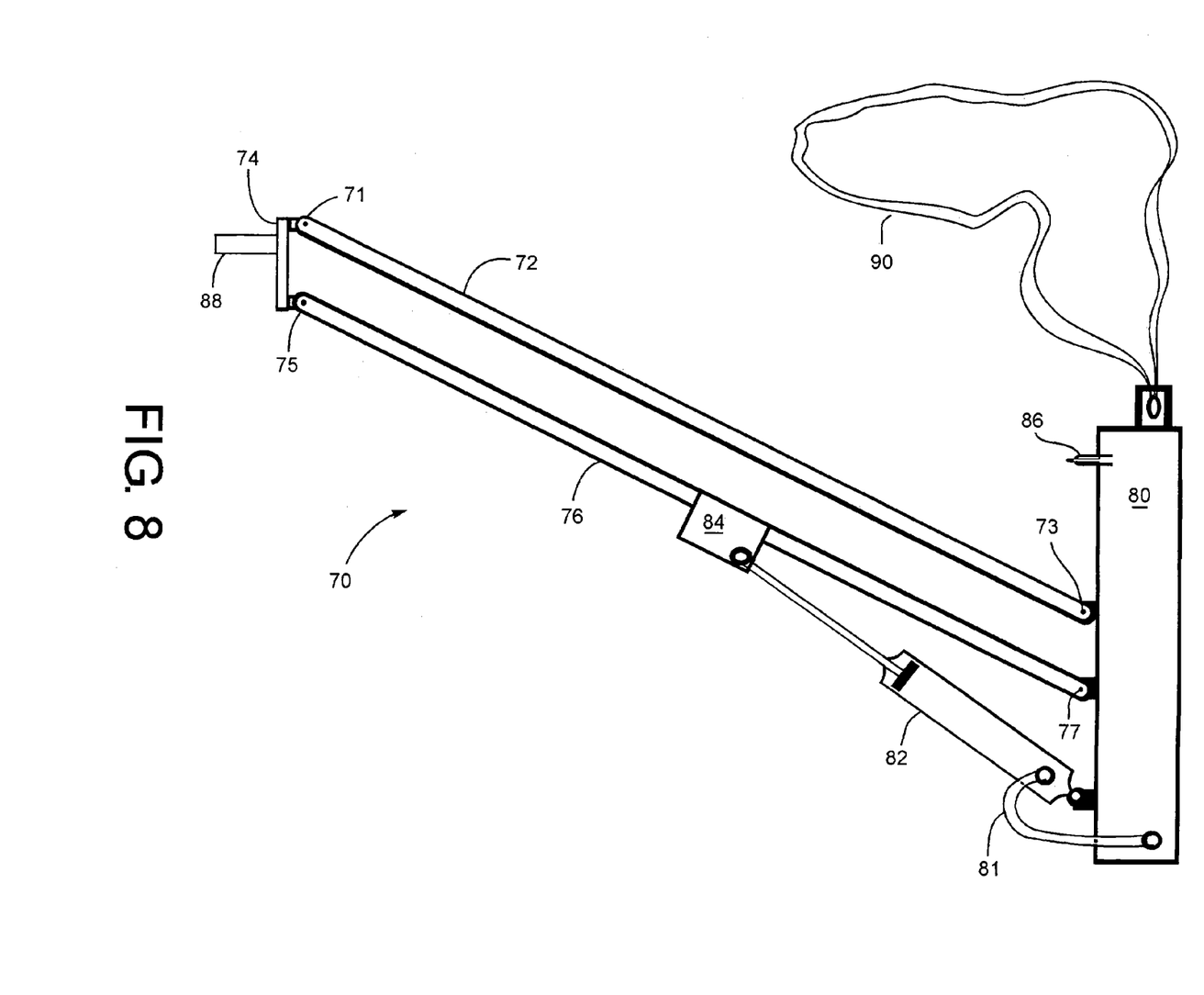
FIG. 8 is a side view of a first embodiment of a hands-free arm.

It is a further feature of the present invention to provide a hands-free support arm, a first embodiment of which is depicted in FIG. 8 generally at 70. Hands-free support arm 70 comprises a first top bar 72 pivotally connected to a first vertically extending member 74 at its first end 71 and to a second vertically extending member 80 at its second end 73. A second bottom bar 76 is pivotally connected to the first vertically extending member 74 at its first end 75 and to said second vertically extending member 80 at its second end 77, first top bar 72, second bottom bar 76, and first (74) and second (80) vertically extending members forming a parallelogram linkage. Air cylinder 82 is connected to the second bottom bar 76 by extending plate 84.

In this embodiment, the second vertically extending member 80 is an auxiliary air reservoir tank with an input port 86. The platform support 20 (or 20') is attached to the hands-free support arm 70 by inserting protrusion 88 in the opening in edge portion 43 of socket plate 42 and attaching thumb screw 56. The vertical height of the platform plate 22 (or 22') can be adjusted by adding air to or letting out air from input port 86. It will be appreciated that different size and weight cameras will require a different pneumatic pressure to provide the desired positioning. The auxiliary air reservoir tank 80 is connected to air cylinder 82 by supply tube 81. Hands-free support arm 70 is mounted on the photographer's body by suspension strap 90 and a second stabilizing strap (not shown) attached to the bottom of auxiliary air reservoir tank 80 and tightened around the photographer's waist to restrict swaying of the arm 70 and its cargo.

Figure 9:
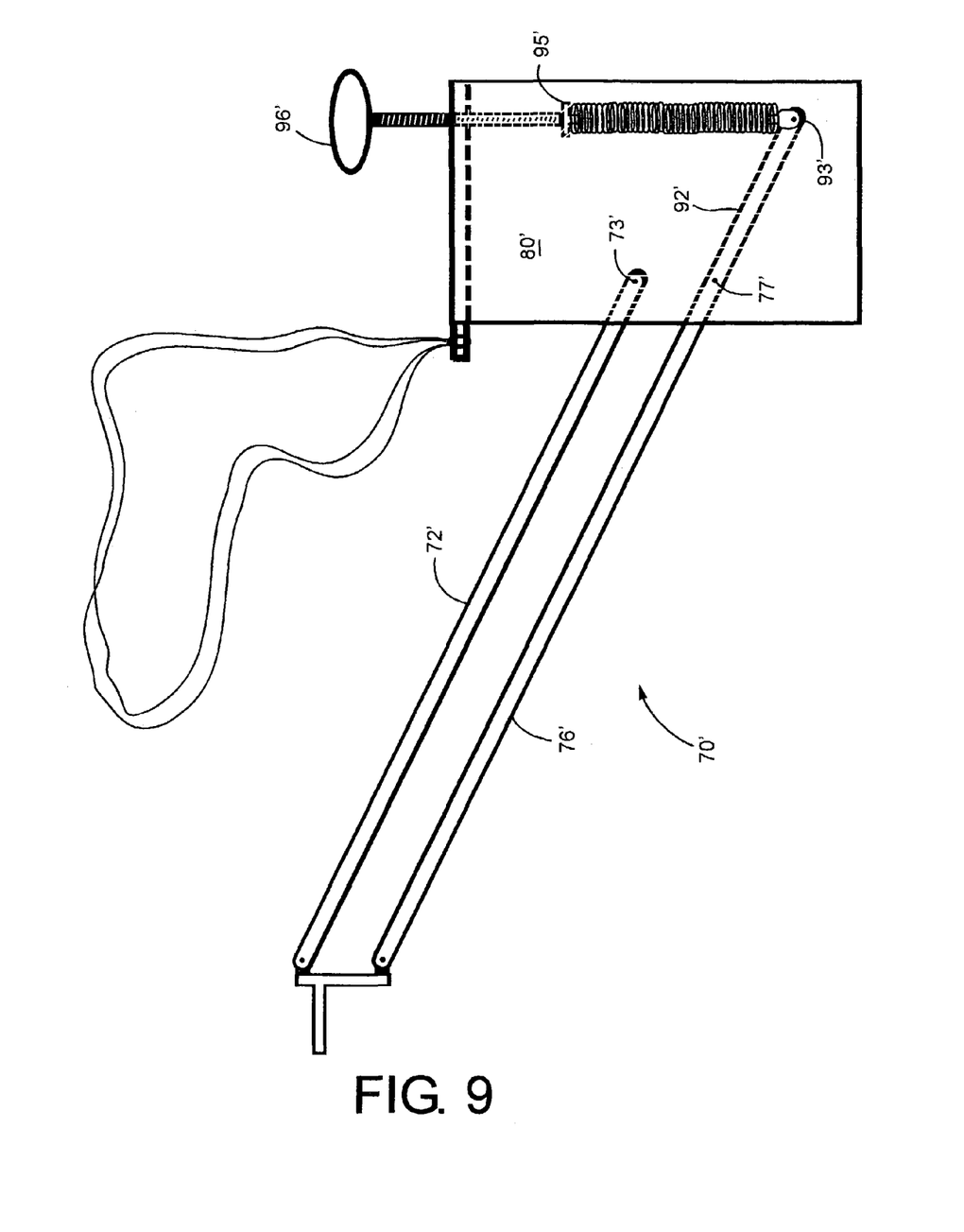
FIG. 9 is a side view of a second embodiment of the hands-free arm.

A second embodiment of the hands-free support arm of the present invention is shown in FIG. 9 generally at 70'. In this second embodiment, the second vertically extending member 80' is a support block. First top bar 72' extends through a slot in the front of support block 80' and is pivotally secured internally of block 80' at 73'. The second bottom bar 76' has an extended length 92' which extends beyond the pivot point 77', which is also internal to support block 80'. A coil compression spring 94' interacts between first reaction surface 93' on the extended length 92' of bottom bar 76' and an adjustable reaction surface 95' inside the support block 80'. The position of adjustable reaction surface 93' can be altered by tightening or loosening the thumb screw 96' to increase or lessen the force on extended length 92' to provide adequate force to cantilever the weight of the platform support 20 (or 20') and the camera (s) mounted thereon.

The present invention is available under the name STEADY ORB and provides benefits over existing camera mounts which are readily apparent. The first embodiment of platform 20 provides a support for the video cameras which are commercially available and provides an alternative to the expensive camera-steadying devices currently available for both the amateur and professional photographer. In addition, the second embodiment provides steady platform support for multiple cameras enabling a photographer to record simultaneously several views of an event. Lastly, several embodiments of a hands-free unit which can be used with this or other camera platforms is shown.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A system for holding a hand-held video camera steady during its movement while recording, said system comprising
   a) a support platform to which the video camera is secured;
   b) a support shaft connected to a bottom surface of said platform;
   c) a sphere affixed to an upper portion of said support shaft;
   d) a socket plate member which pivotally captures said sphere in a socket formed therein, said socket plate freely pivoting about said sphere at all times;
   e) a balance plate connected to a bottom portion of said support shaft to help counterbalance a weight of the camera;
   f) means attachable to said socket plate member by which said support platform and the video camera are suspended;
   whereby when the platform support with the camera supported thereon is transported during video recording using the means attachable to said socket plate member, the camera is maintained in a steady position by a gravitational force.

2. The system of claim 1 wherein said socket plate member permits said sphere to freely pivot ±60° about a roll axis, ±60° about a pitch axis, ±360° about a yaw axis.

3. The camera platform support of claim 1 wherein said support shaft is formed in a first upper portion and a second separate lower portion, and said first upper portion may be locked in any desired position within an angle of ±60° relative to said second lower portion by means of a joint with a locking mechanism.

4. The system of claim 1 wherein said socket plate member comprises a first upper plate with a first downwardly directed truncated spherical recess and a second lower plate with a second upwardly directed truncated spherical recess, said first and second truncated spherical recesses capturing said spherical ball and serving as said spherical ball's bearing surface.

5. The system of claim 4 wherein said spherical ball is made of polytetrafluoroethylene material.

6. The system of claim 1 wherein said means attachable to said socket plate comprises a handle.

7. The system of claim 6 wherein said handle has a first straight portion and a second angled portion.

8. The system of claim 7 wherein said second angled portion forms an angle of 15° with said first straight portion.

* * * * *